(12) United States Patent
Yancey et al.

(10) Patent No.: US 10,515,209 B2
(45) Date of Patent: *Dec. 24, 2019

(54) SANDBOXING THIRD PARTY COMPONENTS

(71) Applicant: Apple Inc., Cupertino, CA (US)

(72) Inventors: Kelly B. Yancey, Mountain View, CA (US); Pierre-Olivier J. Martel, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/952,026

(22) Filed: Apr. 12, 2018

(65) Prior Publication Data

US 2018/0336343 A1    Nov. 22, 2018

Related U.S. Application Data

(63) Continuation of application No. 14/483,543, filed on Sep. 11, 2014, now Pat. No. 9,959,405.

(60) Provisional application No. 62/004,130, filed on May 28, 2014.

(51) Int. Cl.
| | |
|---|---|
| H04L 29/06 | (2006.01) |
| G06F 21/00 | (2013.01) |
| G06F 21/53 | (2013.01) |
| G06F 21/62 | (2013.01) |

(52) U.S. Cl.
CPC .............. G06F 21/53 (2013.01); G06F 21/62 (2013.01); H04L 63/145 (2013.01)

(58) Field of Classification Search
CPC ......... G06F 21/53; G06F 21/62; H04L 63/145
See application file for complete search history.

(56) References Cited

U.S. PATENT DOCUMENTS

| | | |
|---|---|---|
| 7,346,649 B1 | 3/2008 | Wong |
| 8,224,934 B1 | 7/2012 | Donqre et al. |
| 8,438,640 B1 | 5/2013 | Vaish |
| 8,607,340 B2 | 12/2013 | Wright |
| 2002/0082046 A1 | 6/2002 | Peters, III |
| 2005/0203873 A1 | 9/2005 | McDonald |
| 2006/0150247 A1 | 7/2006 | Gafken |
| 2007/0233463 A1 | 10/2007 | Sparre |

(Continued)

OTHER PUBLICATIONS

"Are virtual keyboards themselves secure?", Mar. 4, 2014, Information Security Stack Exchange site, retrieved online, retrieved from <http://web.archive.org/web/20150110085009/http://security.stackexchange.com/questions/52673/are-virtual-keyboards-themselves-secure>, retrieved on Apr. 30, 2016.

Primary Examiner — Lisa C Lewis
(74) Attorney, Agent, or Firm — Womble Bond Dickinson (US) LLP (57) ABSTRACT

A method and apparatus of a device for security management by sandboxing third-party components is described. The device can determine whether a third-party component supports network access. If the third-party component supports network access, the device can request a user input regarding whether to restrict the network access of the component. The device can receive a user input to restrict network access of the third-party component. Upon receiving the user input to restrict network access, the device can construct a sandbox for the third-party component to restrict network access of the component and prevent the component from performing data exfiltration. Other embodiments are also described and claimed.

24 Claims, 6 Drawing Sheets

(56) References Cited

U.S. PATENT DOCUMENTS

| | | |
|---|---|---|
| 2007/0240212 A1 | 10/2007 | Matalytski |
| 2007/0277100 A1 | 11/2007 | Sheha |
| 2008/0016339 A1 | 1/2008 | Shukla |
| 2011/0035364 A1 | 2/2011 | Lipsey |
| 2011/0113467 A1 | 5/2011 | Agarwal |
| 2011/0119736 A1 | 5/2011 | Maeng |
| 2011/0214184 A1 | 9/2011 | Whitehouse |
| 2013/0253906 A1 | 9/2013 | Archer |
| 2013/0321698 A1 | 12/2013 | Harold |
| 2014/0082071 A1 | 3/2014 | Rexer |
| 2014/0101768 A1 | 4/2014 | Miller |
| 2015/0089645 A1 | 3/2015 | Vandergeest |
| 2015/0161381 A1 | 6/2015 | Sun |

SANDBOXING THIRD PARTY COMPONENTS

RELATED MATTERS

This application is a continuation of U.S. application Ser. No. 14/483,543 filed Sep. 11, 2014, which claims the benefit of the earlier filing date of provisional application No. 62/004,130, filed May 28, 2014, entitled "Sandboxing Third Party Components", which are incorporated herein by reference.

FIELD OF DISCLOSURE

This disclosure relates generally to the field of secure computing, and more particularly to sandboxing third party components.

BACKGROUND

Security concerns for all types of processor-based electronic devices, and particularly for computing devices, have become significant. While some concerns may relate to detrimental actions which may be undertaken by defective code implemented by such devices, the greater concerns relate to the ramifications of various types of attacks made upon such devices through malicious code, including code conventionally known in the field by a number of names, such as "viruses", "worms", "Trojan horses", "spyware", "malware", and others. Many of these attacks are directed at computing devices, such as workstations, servers, desktop computers, notebook and handheld computers, and other similar devices. Many of these computing devices can run one or more application programs which a user may operate to perform a set of desired functions.

A number of methodologies have been used in an attempt to reduce or eliminate both the attacks and influence of malicious or defective code. Generally, these methodologies include detection, prevention, and mitigation. Specifically, these methodologies range from attempts to scan, identify, isolate, and possibly delete malicious code before it is introduced to the system or before it does harm (such as is the objective of anti-virus software, and the like), to restricting or containing the actions which may be taken by processes affected by malicious or defective code.

One method to protect a computing system is to sandbox a computer program to protect a computing system from a potentially malicious program. A sandbox is a mechanism utilized to separate a running computer program from other programs and/or computing resources. Some secure computing systems execute untrusted programs, or programs distributed by untrusted parties, in sandboxes. Sandbox restrictions limit the resources a computer program may access. An example of a sandbox environment is an applet that runs in a virtual machine or interpreter.

A virtual keyboard is a software application (e.g., a keyboard application) that allows a user to enter characters. A virtual keyboard can usually be operated with multiple input devices, which may include a touchscreen and a computer mouse. A component is a software package or module that can provide services to one or more applications. A system-wide component is a software package or module that can provide services to different applications in the system. For example, a keyboard application can be a system-wide component because it may be used by many different applications on a device. A first-party is an entity that provides the operating system, or an entity that provides the device hardware and the operating system. A third-party is an entity other than the provider of the operating system that creates an application program to run on the operating system. A third-party component is an application program that is provided by a third-party. A third-party component may not be trusted because it may increase the risk of security breaches. Furthermore, a third-party component may cause the user's privacy to be ignored or compromised, e.g. by conducting data mining on collected user data for commercial purposes.

SUMMARY OF THE DESCRIPTION

A method and apparatus of a device for security management by sandboxing third-party components is described. In an exemplary embodiment, the device can determine whether a third-party component supports network access. If the third-party component supports network access, the device can request a user input regarding whether to restrict the network access of the component. The device can receive a user input to restrict network access of the third-party component. In one embodiment, upon receiving the user input to restrict network access, the device can construct a sandbox for the third-party component to restrict network access of the component and prevent the component from performing data exfiltration. In one embodiment, the third-party component can be used by a user application to provide input data to the user application. In one embodiment, the third-party component is a system-wide third-party component.

The component can be, e.g. a third-party keyboard application, a third-party voice input application, a third-party drawing application, or a third-party motion sensing application. The component can be a third-party output application (e.g., a remote view application that can be used by other applications as their output interface). The component can also be a third-party optical instrument application (e.g., a third-party camera application or a third-party image scanner application). In one embodiment, the component can be a third-party system-wide component.

Other methods and apparatuses are also described. Machine-readable non-transitory media are also described and they include executable computer program instructions which when executed by a data processing system cause the data processing system to perform one or more methods described herein.

BRIEF DESCRIPTION OF THE DRAWINGS

The present invention is illustrated by way of example and not limitation in the figures of the accompanying drawings in which like references indicate similar elements.

DETAILED DESCRIPTION

A method and apparatus of a device that performs security management by sandboxing third-party components is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose device or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that performs security management by sandboxing third-party components is described. In one embodiment, when a third-party component (e.g., a third-party keyboard application) is installed on a device, the device can determine whether the component supports network access. If the third-party component supports network access, the device can ask a user whether to restrict the network access of the component. In response to the user's request to restrict network access of the third-party component, the device can construct a sandbox for the component to restrict network access of the component.

Figure 1:
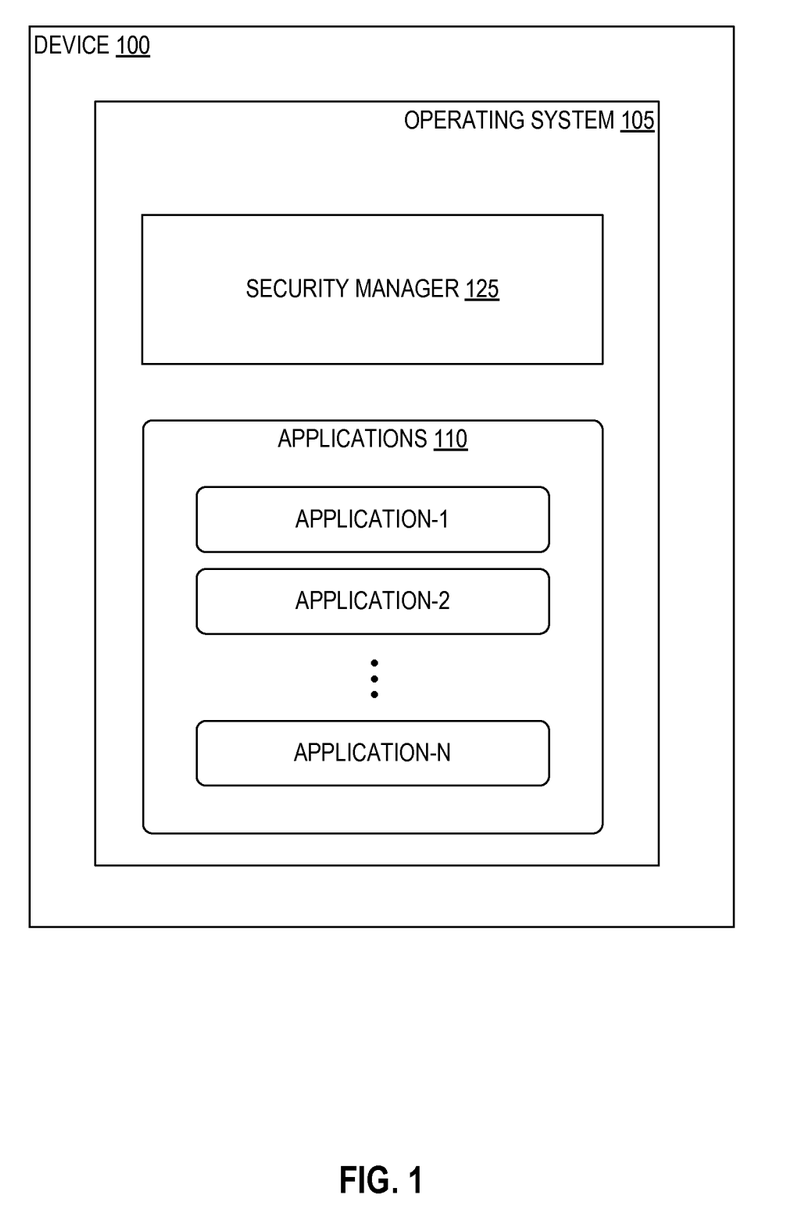
FIG. 1 is a block diagram of one embodiment of a device that performs security management.

FIG. 1 is a block diagram of one embodiment of a device 100 that performs security management. In one embodiment, the device 100 can be a desktop computer, server, smartphone, laptop, personal digital assistant, music playing device, gaming device, or any other device that can execute multiple processes. In FIG. 1, device 100 includes an operating system 105 that is a set of software used to manage device hardware resources and provide common services for other running computer programs, such as application programs. The operating system 105 includes a security manager 125. The operating system 105 manages several applications 110. In one embodiment, the operating system 105 manages several running applications 110 by scheduling a processor of the device 100 to execute each of the running applications. As illustrated in FIG. 1, the applications 110 include several applications 1-N.

In one embodiment, an application is a process that is an instance of an application program that is being executed. In this embodiment, the application may be an application program that is executing as a result of user input. In another embodiment, an application is a thread that is the smallest sequence of programmed instructions that can be managed independently by an operating system scheduler. In one embodiment, a thread is contained inside a process. Multiple threads can exist within the same process and share resources such as memory, while different processes do not share these resources. In one embodiment, a third-party component is a third-party application that provides services to other applications in the operating system 105. In one embodiment, a third-party system-wide component is a third-party application that can provide services to several different applications in the operating system 105.

The security manager 125 identifies and implements security policies for running applications, such as applications 110. In one embodiment, the security manager 125 is part of the kernel of the operating system 105. In another embodiment, the security manger 125 is outside of the kernel of the operating system 105. The security manager 125 may sandbox an application to protect the application from a potentially malicious program. In one embodiment, the security manager 125 separates a running application from other applications and/or computing resources. In one embodiment, the security manager 125 constructs sandboxes for untrusted applications (e.g., third-party components) to limit the resources those applications may access.

The security manager 125 was described above for one embodiment of the invention. One of ordinary skill in the art will realize that in other embodiments, this module can be implemented differently. For instance, in one embodiment described above, this module is implemented as a software module. However, in another embodiment, this module might be implemented by hardware, which can be dedicated application specific hardware (e.g., an ASIC chip or component) or a general purpose chip (e.g., a microprocessor or FPGA).

Figure 2A:
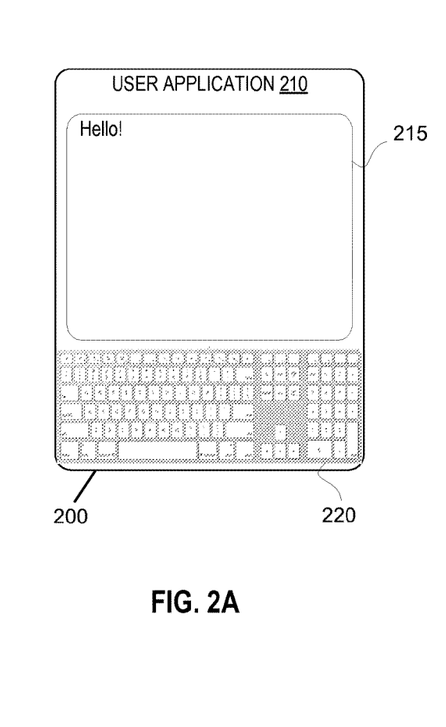
FIG. 2A illustrates an example of a third-party component being used by a user application.

FIG. 2A illustrates an example of a third-party component being used by a user application 210. Specifically, this figure shows a user interface 200 in which a third-party keyboard application 220 is being used by the user application 210. In one embodiment, the third-party keyboard application 220 can be a third-party system-wide component as it may be used by several different applications (e.g., application that need user to input text) on the device. As illustrated in FIG. 2A, the user application 210 uses the third-party keyboard application 220 to input text into a text entry field 215. In one embodiment, the keyboard application 220 only shows up on the user interface 200 when user tries to type text into the text entry field 215.

Figure 2B:
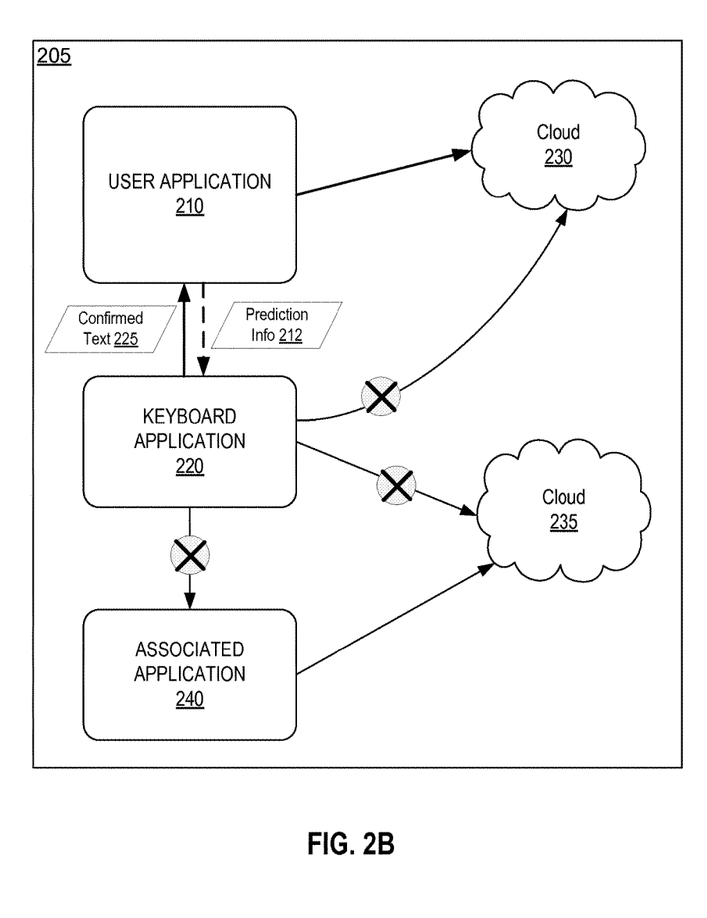
FIG. 2B illustrates a diagram that shows the different applications involved in the scenario described in FIG. 2A.

The third-party keyboard application 220 may look like a part of the user application 210, as illustrated in FIG. 2A. However, the keyboard application 220 and the user application 210 are two different applications. FIG. 2B illustrates a diagram 205 that shows the different applications involved in the scenario described in FIG. 2A. As illustrated in FIG. 2B, the user application 210 and the third-party keyboard application 220 are two separate applications. The two applications work together to type text into any text entry field for the user application 210.

In one embodiment, the third-party keyboard application 220 sends user confirmed text 225 to the user application 210. The user confirmed text 225 may not be the same as the text the user actually typed because the keyboard application may be able to predict a word or a set of words based on what the user has typed and the user will confirm the word or the set of words if the prediction is correct. In one embodiment, the user application 210 optionally sends back text prediction information 212 to the keyboard application 220.

The user application 210 can be any application that has a text entry field (e.g., text entry field 215 in the user interface 200). When a user tries to type text into the text entry field, the third-party keyboard application 220 is activated to collaborate with the user application 210. The user application may choose to send its application data (including the confirmed text 225 it received from the keyboard application 220) to a cloud server 230 or another device (not shown).

In one embodiment, the third-party keyboard application 220 is prohibited from sending its private data to the cloud server 230 or 235, or other devices (not shown). In one embodiment, the keyboard application 220 is prohibited from sending its private data to an associated application 240 if the associated application 240 will forward the data to the cloud server 235 or another device (not shown). The associated application 240 is an application that is connected to the keyboard application 220, but does not invoke the main functionality (e.g., text inputting) of the keyboard application 220.

In one embodiment, the device can prevent the third-party keyboard application 220 from sending its private data to the cloud servers 230 or 235, or the associated application 240 by constructing a restrictive sandbox for the keyboard application 220. The sandbox of the keyboard application 220 can restrict network access or otherwise prevent data exfiltration by the keyboard application 220. Data exfiltration means taking data out of a secured container or environment. In one embodiment, the device constructs the restrictive sandbox for the keyboard application 220 by default. In another embodiment, the device constructs the restrictive sandbox only when a user requests it.

The scenario described above in FIGS. 2A and 2B is for one embodiment of the disclosure. One of ordinary skill in the art will realize that, instead of the third-party keyboard application 220, other third-party components may be used by the user application 210 in other embodiments. Those third-party components may include a third-party voice input application, a third-party drawing application, a third-party motion sensing application, a third-party output application (e.g., a remote view application that can be used by other applications as their output interface), or a third-party optical instrument application (e.g., a third-party camera application or a third-party image scanner application).

Figure 3:
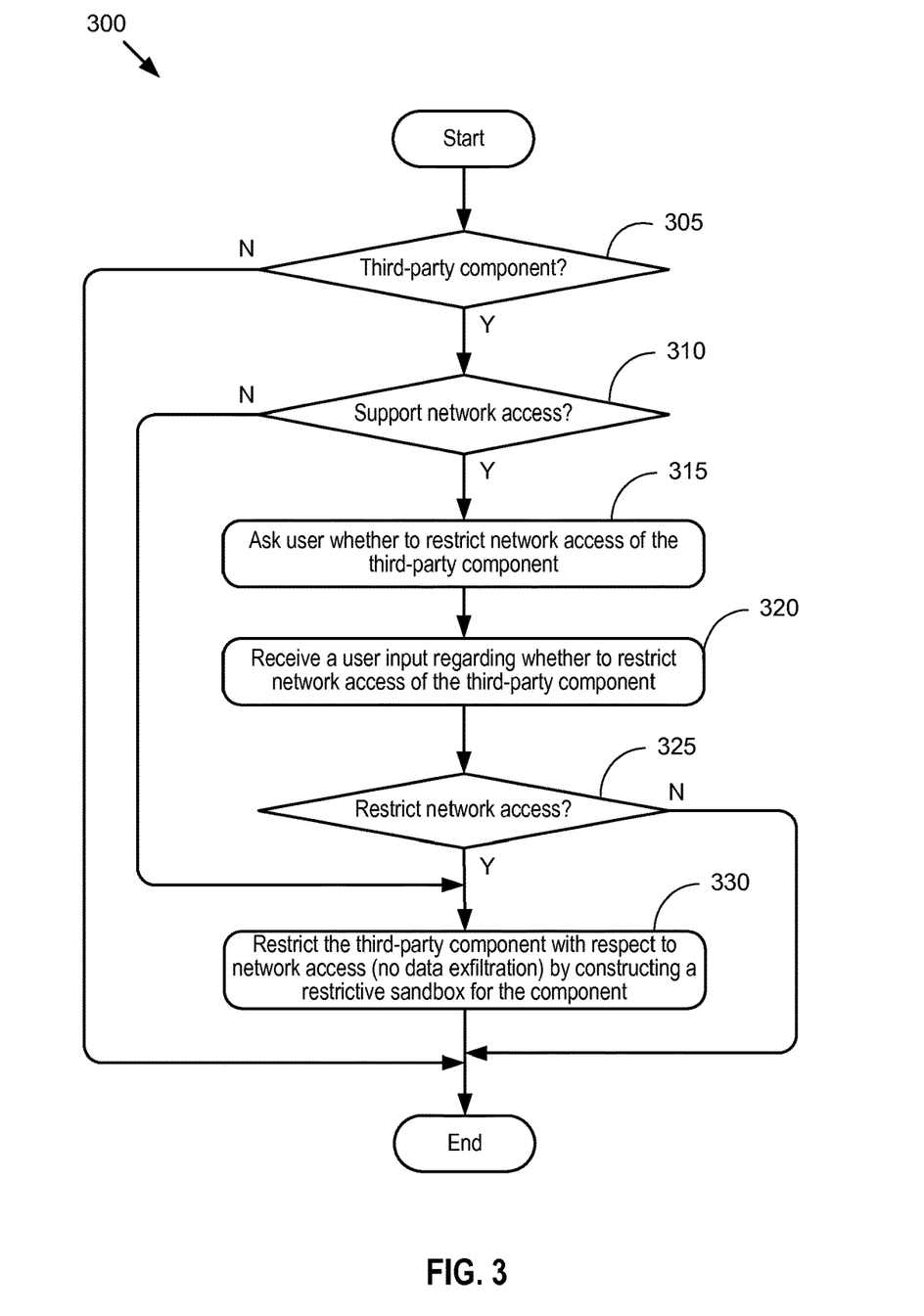
FIG. 3 illustrates a flowchart of one embodiment of a process to perform security management on a device by sandboxing a third-party component.

FIG. 3 illustrates a flowchart of one embodiment of a process 300 to perform security management on a device by sandboxing a third-party component. In one embodiment, the third-party component is a keyboard application. In one embodiment, the third-party component can be a third-party system-wide component as it may be used by several different applications on the device. For example, a keyboard application may be used by several different applications to input text. In one embodiment, the security manager 125 described in FIG. 1 above executes process 300 to perform security management. In one embodiment, process 300 is invoked when a third-party application is installed on the device.

In FIG. 3, process 300 begins by determining (at block 305) whether an installed application is a third-party component. In one embodiment, a third party component can be a third-party keyboard application. In another embodiment, a third party component can be a third-party voice input application, a third-party drawing application, a third-party motion sensing application, a third-party output application (e.g., a remote view application that can be used by other applications as their output interface), or a third-party optical instrument application (e.g., a third-party camera application or a third-party image scanner application). In one embodiment, a third-party component can be a third-party system-wide component as it may be used by several different applications on the device. For example, a third-party keyboard application may be used by several different applications to input text.

If the installed third-party application is not a third-party component, process 300 terminates. In one embodiment, the operating system constructs a sandbox with normal resource access rights for the third-party application if it is not a third-party component. If it is determined (at block 305) that the installed application is a third-party component, process 300 determines (at block 310) whether the third-party component supports network access. In one embodiment, an application supports network access when it is able to send its private data to a cloud server or another device. If the third-party component supports network access, process 300 asks (at block 315) a user whether to restrict network access of the third-party component. In one embodiment, restricting network access of an application is done to prevent the application from performing data exfiltration, which takes private data out of a secured container or environment. If it is determined (at block 310) that the third-party component does not support network access, process 300 proceeds to block 330.

At block 320, process 300 receives a user input regarding whether to restrict network access of the third-party component. At block 325, process 325 determines whether the user input is a request to restrict network access of the third-party component. If the user does not want to restrict network access of the third-party component, process 300 terminates. In one embodiment, the operating system constructs a sandbox with normal resource access rights for the third-party component if the user does not want to restrict network access of the component.

If it is determined (at block 325) that the user wants to restrict network access of the third-party component, process 300 restricts the third-party component with respect to network access by constructing a restrictive sandbox for the component. In one embodiment, the restrictive sandbox can make sure that the third-party component cannot access networking resources of the system. In one embodiment, the restrictive sandbox can prevent the third-party component from performing data exfiltration. One of ordinary skill in the art will recognize that in addition to preventing network access by the third-party component, the restrictive sandbox can also prevent the component from accessing other resources in order to prevent data exfiltration. For example and in one embodiment, the restrictive sandbox can prevent the third-party component from accessing volatile memory (e.g., DRAM) in the system. In one embodiment, the restrictive sandbox can prevent the third-party component from accessing non-volatile memory (e.g., hard drive, flash memory) in the system. In one embodiment, the restrictive sandbox can prevent the third-party component from accessing inter-process communication (IPC) resources (e.g., file, messages, sockets, shared memory, pipe, semaphore, shared memory, etc.).

One of ordinary skill in the art will recognize that process 300 is a conceptual representation of the operations used to perform security management. The specific operations of process 300 may not be performed in the exact order shown and described. The specific operations may not be performed in one continuous series of operations, and different specific operations may be performed in different embodiments. For example, operations in blocks 315-325 may be skipped, so that upon the determination that the third-party component supports network access, a sandbox that restricts network access of the third-party component is constructed for the component without seeking authorization from the user. Furthermore, process 300 could be implemented using several sub-processes, or as part of a larger macro process.

Figure 4:
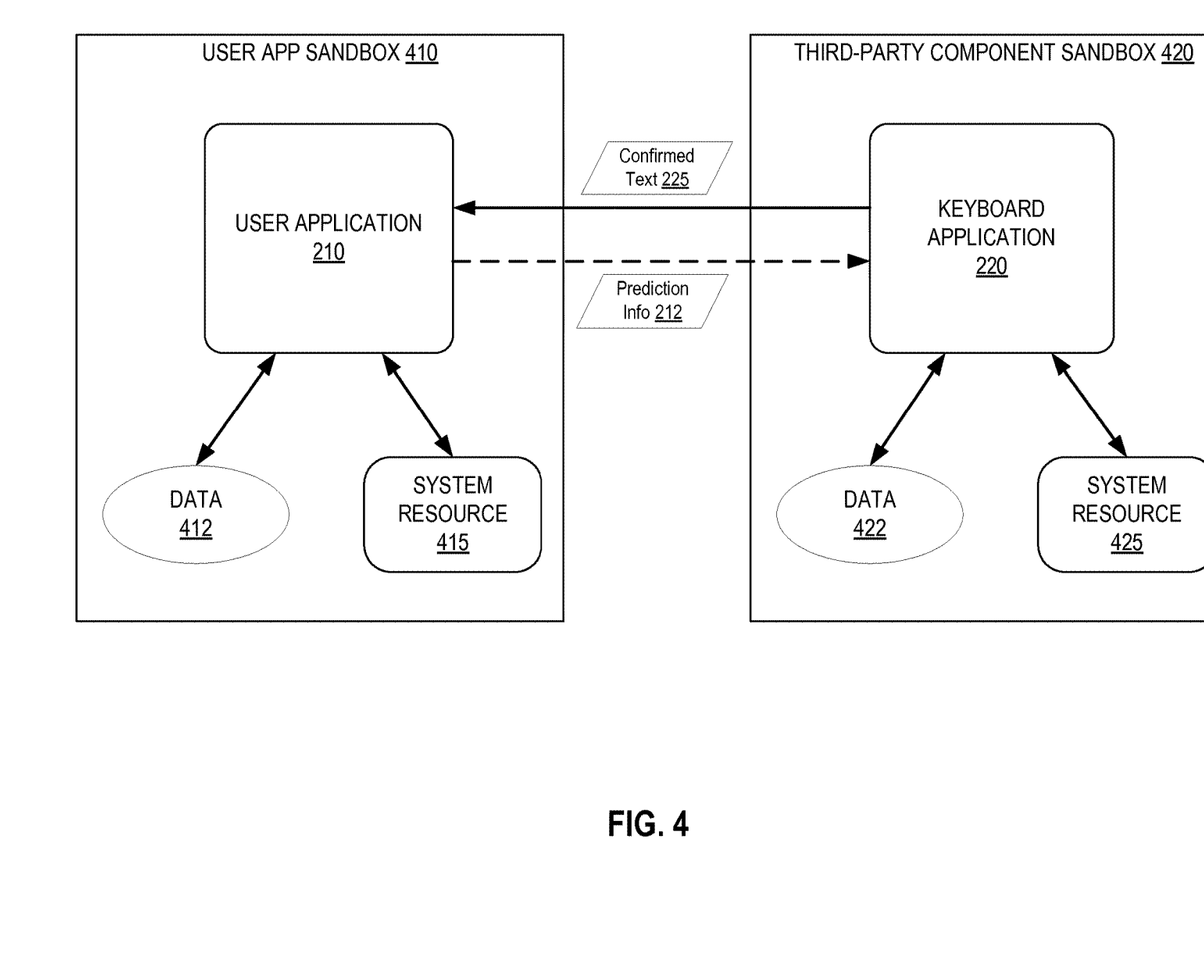
FIG. 4 illustrates a detailed diagram of sandboxing a third-party component.

FIG. 4 illustrates a detailed diagram of sandboxing a third-party component. Specifically, this figure illustrates a detailed diagram of the sandboxing of the user application 210 and the keyboard application 220 described in FIG. 2B above. In one embodiment, the third-party component can be a third-party system-wide component as it may be used by several different applications on the device. For example, a keyboard application 220 may be used by several different applications to input text. In one embodiment, the security manager 125 described in relation to FIG. 1 above facilitates the sandboxing of the applications. As shown in FIG. 4, a user application sandbox 410 is constructed for the user application 210 and a third-party component sandbox 420 is constructed for the keyboard application 220. In one embodiment, the third-party component sandbox 420 is constructed as a result of the operations described in block 330 of FIG. 3 above.

The user application 210 has unrestricted access to its private data 412 and system resource 415. In one embodiment, system resource 415 includes most of the system resources (e.g., networking) that a regular application is entitled to access. Because of the user application sandbox 410, the user application 210 cannot access data or system resources outside of the user application sandbox 410.

The keyboard application 220 has unrestricted access to its private data 422 and system resource 425. The private data 422 may include the sequence of the keys typed, the text that the keyboard application 220 predicted, past typing pattern of the user for particular words, and a dictionary of words used by the user before. The system resource 425 is a white list of system resources that are explicitly allowed for the keyboard application 220 to access. If a system resource is not listed in the system resource 425, the keyboard application 220 cannot access the system resource. In one embodiment, system resource 425 does not include networking resources or any other resources that may cause data exfiltration. For example and in one embodiment, system resource 425 does not include access to volatile memory (e.g., DRAM) in the system. In one embodiment, system resource 425 does not include access to non-volatile memory (e.g., hard drive, flash memory) in the system. In one embodiment, system resource 425 does not include access to inter-process communication (IPC) resources (e.g., file, messages, sockets, shared memory, pipe, semaphore, shared memory, etc.). Data exfiltration means the private data 422 of keyboard application 220 leaking outside of the third-party component sandbox 420. Because of the third-party component sandbox 420, the keyboard application 220 cannot access data or system resources outside of the third-party component sandbox 420.

Because of sandboxing, the user application 210 cannot access the private data 422 of the keyboard application, and the keyboard application 220 cannot access the private data 412 of the user application 210. The only data exchange channel between the two applications is the keyboard application 220 sending confirmed text 225 to the user application 210 and optionally receiving prediction information 212 back. The keyboard application 220 is not allowed to send its private data 422 to the user application 210 or any other application or device outside of the third-party component sandbox 420 because of the limited system resource 425 it can access.

Figure 5:
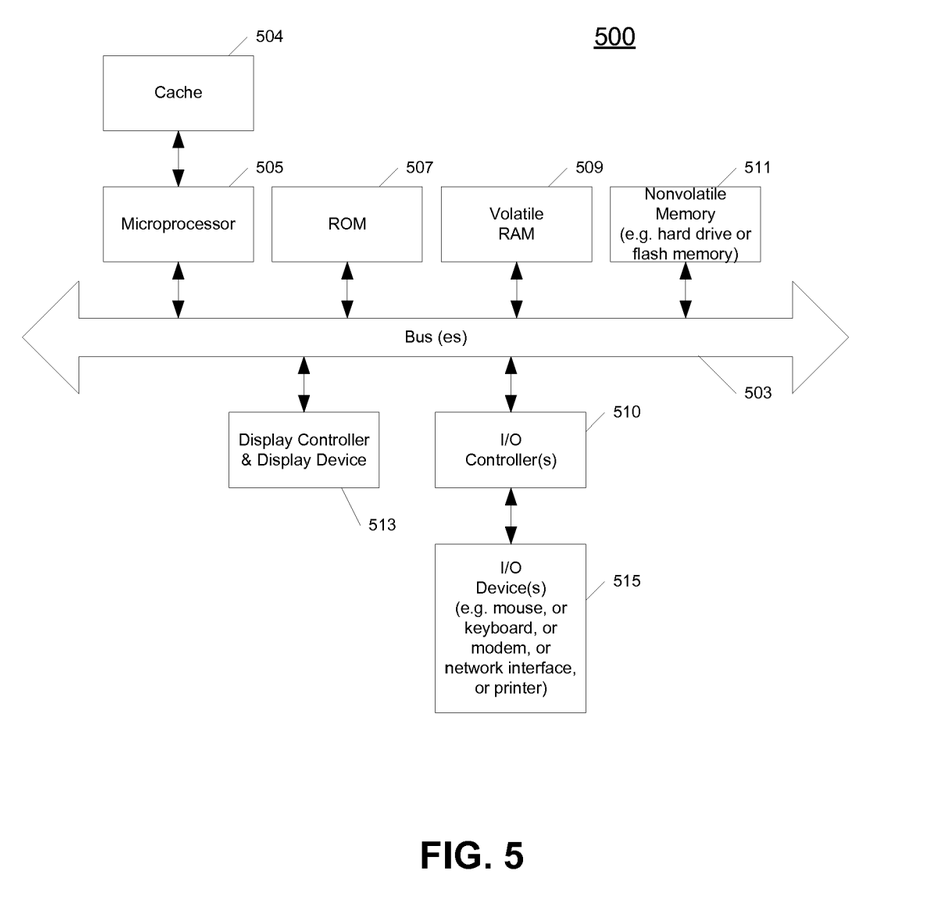
FIG. 5 shows one example of a data processing system, which may be used with one embodiment of the present invention.

FIG. 5 shows one example of a data processing system 500, which may be used with one embodiment of the present invention. For example, the system 500 may be implemented including a device 100 as shown in FIG. 1. Note that while FIG. 5 illustrates various components of a device, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 5, the device 500, which is a form of a data processing system, includes a bus 503 which is coupled to a microprocessor(s) 505 and a ROM (Read Only Memory) 507 and volatile RAM 509 and a non-volatile memory 511. The microprocessor 505 may retrieve the instructions from the memories 507, 509, 511 and execute the instructions to perform operations described above. The bus 503 interconnects these various components together and also interconnects these components 505, 507, 509, and 511 to a display controller and display device 513 and to peripheral devices such as input/output (I/O) devices 515 which may be mice, keyboards, modems, network interfaces, printers and other devices which are well known in the art. Typically, the input/output devices 515 are coupled to the system through input/output controllers 510. The volatile RAM (Random Access Memory) 509 is typically implemented as dynamic RAM (DRAM), which requires power continually in order to refresh or maintain the data in the memory.

The non-volatile memory 511 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 511 will also be a random access memory although this is not required. While FIG. 5 shows that the non-volatile memory 511 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 503 may include one or more buses connected to each other through various bridges, controllers and/or adapters as is well known in the art.

Figure 6:
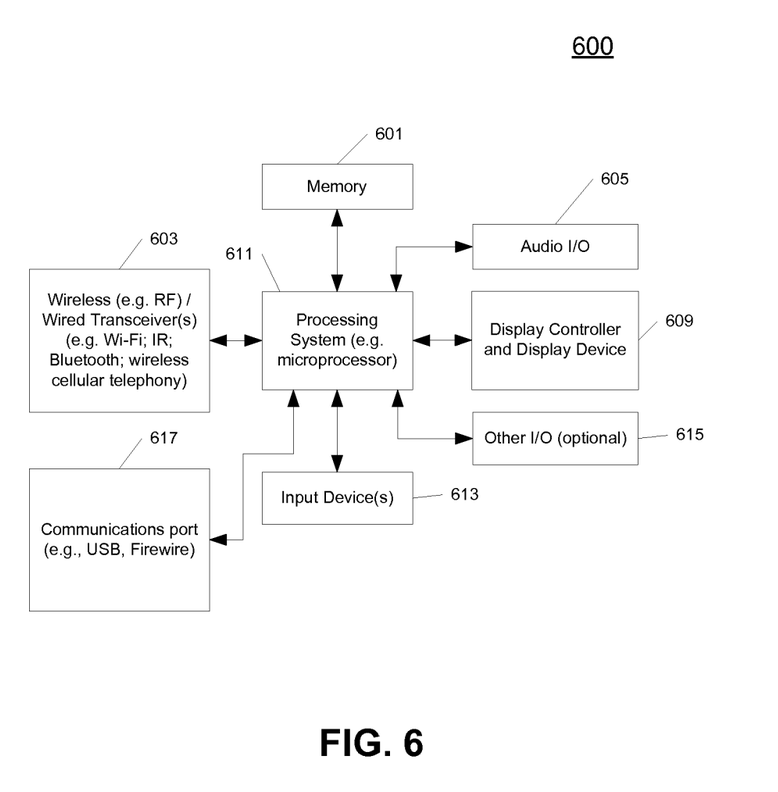
FIG. 6 shows an example of another data processing system which may be used with one embodiment of the present invention.

FIG. 6 shows an example of another data processing system 600 which may be used with one embodiment of the present invention. For example, system 600 may be implemented as a device 100 as shown in FIG. 1. The data processing system 600 shown in FIG. 6 includes a processing system 611, which may be one or more microprocessors, or which may be a system on a chip integrated circuit, and the system also includes memory 601 for storing data and programs for execution by the processing system. The system 600 also includes an audio input/output subsystem 605, which may include a microphone and a speaker, for example, for playing back music or providing telephone functionality through the speaker and microphone.

A display controller and display device 609 provide a visual user interface for the user; this digital interface may include a graphical user interface which is similar to that shown on a Macintosh computer when running OS X operating system software, or Apple iPhone when running the iOS operating system, etc. The system 600 also includes one or more wireless transceivers 603 to communicate with another data processing system, such as the system 600 of FIG. 6. A wireless transceiver may be a WLAN transceiver, an infrared transceiver, a Bluetooth transceiver, and/or a wireless cellular telephony transceiver. It will be appreciated that additional components, not shown, may also be part of the system 600 in certain embodiments, and in certain embodiments fewer components than shown in FIG. 6 may also be used in a data processing system. The system 600 further includes one or more communication ports 617 to communicate with another data processing system, such as the system in FIG. 5. The communication port may be a USB port, Firewire port, Bluetooth interface, etc.

The data processing system 600 also includes one or more input devices 613, which are provided to allow a user to provide input to the system. These input devices may be a keypad or a keyboard or a touch panel or a multi touch panel. The data processing system 600 also includes an optional input/output device 615 which may be a connector for a dock. It will be appreciated that one or more buses, not shown, may be used to interconnect the various components as is well known in the art. The data processing system shown in FIG. 6 may be a handheld device or a personal digital assistant (PDA), or a cellular telephone with PDA like functionality, or a handheld device which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 600 may be a network computer or an embedded processing device within another device, or other types of data processing systems, which have fewer components or perhaps more components than that shown in FIG. 6.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in U.S. Pat. Nos. 7,345,671 and 7,627,343, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose device selectively activated or reconfigured by a computer program stored in the device. Such a computer program may be stored in a computer readable storage medium, such as, but not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a device bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a selfconsistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "requesting," "constructing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method of security management for a data processing system, the method comprising:
    determining whether a third-party component supports or requests access to a network coupled to the data processing system, wherein the third-party component provides input data to a user application;
    constructing a restrictive access sandbox for the third-party component in response to determining to restrict access to the network by the third-party component, wherein the third-party component, executing within the restrictive access sandbox, sends to the user application input data based on input to the third-party component, and stores prediction information received from the user application in the restrictive access sandbox for subsequent access by the third-party component to predict input data for input to the third-party component.

2. The non-transitory machine-readable medium of claim 1, wherein the third-party component is a third-party keyboard application and wherein the method further comprises:
    constructing a normal access sandbox for the third-party component in response to receiving an input indicating not to restrict access of system resources by the third-party component.

3. The non-transitory machine-readable medium of claim 1, wherein the third-party component is a third-party voice input application.

4. The non-transitory machine-readable medium of claim 1, wherein the third-party component is a third-party drawing application or a third-party motion sensing application.

5. The medium as in claim 1 wherein the third party component is a keyboard application.

6. The medium as in claim 1 wherein the restrictive access sandbox stores prediction information generated by the third party component.

7. The non-transitory machine-readable medium of claim 1, wherein the third-party component is a third-party optical instrument application, wherein the third-party optical instrument application is a third-party camera application or a third-party image scanner application.

8. The non-transitory machine-readable medium of claim 1, wherein the constructing of the restrictive access sandbox for the third-party component further comprises preventing data exfiltration by the third-party component.

9. The non-transitory machine-readable medium of claim 1, wherein the user application transmits text sent by the third-party component and the corresponding text prediction information through the network for storage.

10. A computer-implemented method for security management of a data processing system, the method comprising:
    determining whether a third-party component supports or requests access to a network coupled to the data processing system, wherein the third-party component provides input data to a user application;
    constructing a restrictive access sandbox for the third-party component in response to determining to restrict access to the network by the third-party component, wherein the third-party component executing within the restrictive access sandbox, sends to the user application input data based on input to the third-party component, and stores prediction information received from the user application in the restrictive access sandbox for subsequent access by the third-party component to predict input data for input to the third party component.

11. The method of claim 10, wherein the third-party component provides input data to a user application and wherein the method further comprises:
    constructing a normal access sandbox for the third-party component in response to receiving an input indicating not to restrict access of system resources by the third-party component.

12. The method of claim 10, wherein the third-party component is a third-party keyboard application and wherein the restrictive access sandbox stores prediction information generated by the third party component.

13. The method of claim 10, wherein the third-party component is a third-party voice input application.

14. The method of claim 10, wherein the third-party component is a third-party drawing application or a third-party motion sensing application.

15. The method of claim 10, wherein the third-party component is a third-party optical instrument application, wherein the third-party optical instrument application is a third-party camera application or a third-party image scanner application.

16. The method of claim 10, wherein the constructing of the restrictive access sandbox for the third-party component further comprises preventing data exfiltration of the third-party component.

17. The method of claim 10, wherein the user application transmits text sent by the third-party component and the corresponding text prediction information through the network for storage.

18. A device to perform security management, the device comprising:
a processing system;
a memory coupled to the processing system through a bus;
a network coupled to the processing system through the bus; and
a process executed from the memory by the processing system that causes the processing system to determine whether a third-party component supports or requests access to the network, construct a restrictive access sandbox for the third-party component in response to determining to restrict access to system resources by the third-party component, wherein the third-party component, executing within the restrictive access sandbox, sends to the user application input data based on input to the third-party component, and stores prediction information received from the user application in the restrictive access sandbox for subsequent access by the third-party component to predict input data for input to the third party component.

19. The device of claim 18, wherein the third-party component is a third-party keyboard application or a third-party voice input application and wherein the restrictive access sandbox further storing predication information generated by the third-party component, and the process to construct a normal access sandbox for the third-party component in response to receiving an input indicating not to restrict access of system resources by the third-party component.

20. The device of claim 18, wherein the third-party component is a third-party drawing application or a third-party motion sensing application.

21. The device of claim 18, wherein the third-party component is a third-party optical instrument application, wherein the third-party optical instrument application is a third-party camera application or a third-party image scanner application.

22. The device of claim 18, the user application transmits text sent by the third-party component and the corresponding text prediction information through the network for storage.

23. A computer-implemented method comprising:
sending, by a third-party component to a user application, input data based on input to the third-party component, the third-party component executing on a processing system within a restrictive access sandbox generated by the processing system in response to determining to prevent the third-party component from transmitting data through a network without control by the restrictive access sandbox;
receiving, by the third-party component from the user application, prediction information for use in predicting input;
storing, by the third-party component, the prediction information from the user application in the restrictive access sandbox, the restrictive access sandbox further storing predication information generated by the third-party component;
accessing, by the third-party component, the restrictive access sandbox to predict input.

24. A non-transitory machine-readable medium having executable instructions to cause one or more processing units to perform a method comprising:
sending, by a third-party component to a user application, input data based on input to the third-party component, the third-party component executing on a processing system within a restrictive access sandbox generated by the processing system in response to determining to prevent the third-party component from transmitting data through a network;
receiving, by the third-party component from the user application, prediction information for use in predicting input;
storing, by the third-party component, the prediction information from the user application in the restrictive access sandbox, the restrictive access sandbox further storing predication information generated by the third-party component;
accessing, by the third-party component, the prediction information stored in the restrictive access sandbox to predict input.

* * * * *